United States Patent
Chahal et al.

(10) Patent No.: US 9,971,669 B2
(45) Date of Patent: May 15, 2018

(54) PREDICTING PERFORMANCE OF A SOFTWARE APPLICATION OVER A TARGET SYSTEM

(71) Applicant: Tata Consultancy Services Limited, Mumbai, Maharashtra (IN)

(72) Inventors: Dheeraj Chahal, Maharashtra (IN); Subhasri Duttagupta, Maharashtra (IN); Manoj Karunakaran Nambiar, Maharashtra (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 492 days.

(21) Appl. No.: 14/682,306

(22) Filed: Apr. 9, 2015

(65) Prior Publication Data

US 2016/0188431 A1  Jun. 30, 2016

(30) Foreign Application Priority Data

Dec. 24, 2014  (IN) .......................... 4148/MUM/2014

(51) Int. Cl.
*G06F 11/30* (2006.01)
*G06F 11/34* (2006.01)

(52) U.S. Cl.
CPC ...... *G06F 11/3447* (2013.01); *G06F 11/3428* (2013.01); *G06F 11/3414* (2013.01); *G06F 2201/865* (2013.01)

(58) Field of Classification Search
None
See application file for complete search history.

(56) References Cited

U.S. PATENT DOCUMENTS

| 2004/0054515 | A1* | 3/2004 | Todi .................... G06F 11/3461 703/22 |
| 2014/0012561 | A1 | 1/2014 | Chang et al. |
| 2014/0089495 | A1 | 3/2014 | Akolkar et al. |
| 2016/0246647 | A1* | 8/2016 | Harris .................. G06F 9/5027 |

OTHER PUBLICATIONS

Aashish Phansalkar, Lizy K. John; "Performance Prediction using Program Similarity"; University of Texas at Austin; Feb. 2006.
Rosario Cammarota, Laleh Aghababaie Beni Alexandru Nicolau, and Alexander V. Veidenbaum; "Optimizing Program Performance via Similarity, Using a Feature-agnostic Approach"; Department of Computer Science, University of California Irvine; Aug. 27, 2013.

* cited by examiner

*Primary Examiner* — Aditya Bhat
(74) *Attorney, Agent, or Firm* — Thompson Hine LLP

(57) ABSTRACT

System and method for predicting performance of a software application over a target system is disclosed. The method comprises generating a benchmark suite such that benchmark indicates a combination of workloads applied over a set of standard software applications running on a source system. The method further comprises identifying a benchmark of the benchmark suite, wherein the benchmark has performance characteristics same as that of the software application. The method further enables remotely executing the set of standard software applications associated with the benchmark on the target system with the combination of workload as specified by the benchmark. The method further enables recording a performance of the set of standard software applications on the target system. Based on the performance of the standard software applications on the target system the performance of the software application is predicted.

13 Claims, 6 Drawing Sheets

PREDICTING PERFORMANCE OF A SOFTWARE APPLICATION OVER A TARGET SYSTEM

CROSS-REFERENCE TO RELATED APPLICATIONS AND PRIORITY

The present application claims priority from an Indian patent application number 4148/MUM/2014 filed on Dec. 24, 2014.

TECHNICAL FIELD

The present disclosure in general relates to performance prediction. More particularly, the present disclosure relates to a system and method for performance prediction of a software application that is to be executed over a target system.

BACKGROUND

Today, a large number of scalable software applications are developed to run over multi-tier target systems. However, one of the key challenges is predicting the performance of the software application when it is to be deployed on a new platform. Performance prediction and bottleneck detection for the software applications is a necessity because deploying the software applications on a target system is both costly and time consuming. Also, for capacity planning purposes, it is advantageous to understand performance of the software applications without actually running the software applications on the target system. Performance prediction of the software applications under a given workload on the target system is a complex and a tedious task.

In order to predict performance of such software applications, Researchers, Practitioners and Developers in the industry follow intuitive and non-systematic approaches. However, intuitive and non-systematic approaches are error-prone and lead to inaccurate predictions resulting in huge losses due to faulty capacity planning. The process of performance prediction becomes much more challenging if the software applications are to be deployed over a target system which has multi-tier architecture.

Conventionally, performance prediction is performed using a simulator, building analytical model or using architectural simulator of the target system. The process of simulation involves careful analysis of each of the components of the target system, representing each of the components accurately in a queuing model, and implementing the business function flow through the target system. The entire process of simulation is quite complex. Further, analytical models have a drawback that these models require knowledge of the exact deployment scenario and associated models need to be built for the specific software applications. If the software application behaviour or the infrastructure of the target system changes, the models are required to be rebuilt. Furthermore, architectural simulator is useful for knowing the software application performance if the target system is limited to a single server only. The architectural simulator does not allow performance prediction over a multi-tier target system. Executing the software applications for different workloads involves executing the software applications multiple times on the architectural simulator, wherein such execution requires significant simulation time. Thus, there is a need for a performance prediction system which can effectively monitor the performance of the software applications deployed over multi-tier target systems.

SUMMARY

This summary is provided to introduce aspects related to systems and methods for determining performance of a software application over a target system based on the performance of a set of standard applications on a source system and the aspects are further described below in the detailed description. This summary is not intended to identify essential features of the claimed subject matter nor is it intended for use in determining or limiting the scope of the claimed subject matter.

In one implementation, a method for predicting performance of a software application over a target system is disclosed. Initially, a benchmark suite is generated by a processor such that benchmark indicates a combination of workloads applied over a set of standard software applications running on a source system and performance characteristics, wherein the performance characteristics are derived based on the combination of workloads applied over the set of standard software applications running on the source system. In the next step, a benchmark having performance characteristics same as that of the software application is identified by the processor from the benchmark suite. Further, the set of standard software applications associated with the benchmark are remotely executed on the target system by the processor with the combination of workload as specified by the benchmark. In the next step, a performance of the set of standard software applications on the target system is recorded by the processor. Finally, a performance of the software application is predicted by the processor based on the performance of the standard software applications on the target system.

In one implementation, a system for predicting performance of a software application over a target system is disclosed. The system comprises a processor and a memory coupled to the processor, wherein the system is configured to generate a benchmark suite such that benchmark indicates a combination of workloads applied over a set of standard software applications running on a source system and performance characteristics, wherein the performance characteristics are derived based on the combination of workloads applied over the set of standard software applications running on the source system. The system further identifies a benchmark of the benchmark suite, wherein the benchmark has performance characteristics same as that of the software applications. The system further configured for remotely executing the set of standard software applications associated with the benchmark on the target system with the combination of workload as specified by the benchmark and records performance of the set of standard software applications on the target system. Based on the performance of the standard software applications on the target system, the performance of software application is predicted by the system.

In one implementation, a computer program product having embodied thereon a computer program for predicting performance of a software application over a target system is disclosed. The program comprises a program code for generating a benchmark suite such that benchmark indicates a combination of workloads applied over a set of standard software applications running on a source system and performance characteristics, wherein the performance characteristics are derived based on the combination of workloads applied over the set of standard software applications running on the source system. The program comprises a program code for identifying a benchmark of the benchmark suite, wherein the benchmark has performance characteristics same as that of the software application. The program further comprises a program code for remotely executing the set of standard software applications associated with the benchmark on the target system with the combination of workload as specified by the benchmark. The program further comprises a program code for recording a performance of the set of standard software applications on the target system and predicting performance of the software application based on the performance of the standard software applications on the target system.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like/similar features and components.

DETAILED DESCRIPTION

The present disclosure relates to systems and methods for performance prediction of a software application over a target system.

In one implementation, the system is configured to generate a benchmark suite such that benchmark indicates a combination of workloads applied over a set of standard software applications running on a source system. The system is further configured to identify a benchmark from the benchmark suite, wherein the benchmark has the same performance characteristics as that of the software application. Once the benchmark is identified, the system remotely executes the set of standard software applications associated with the benchmark on the target system with the combination of workload as specified by the benchmark. In the next step, the system records performance of the set of standard software applications on the target system. Based on the performance of the standard software applications on the target system, the performance of software application is predicted by the system.

While aspects of the described system and method for performance prediction of software application over a target system are implemented over a dedicated platform, it may be implemented in any number of different computing systems, environments, and/or configurations, the embodiment's are described in the context of the following exemplary system.

Figure 1:
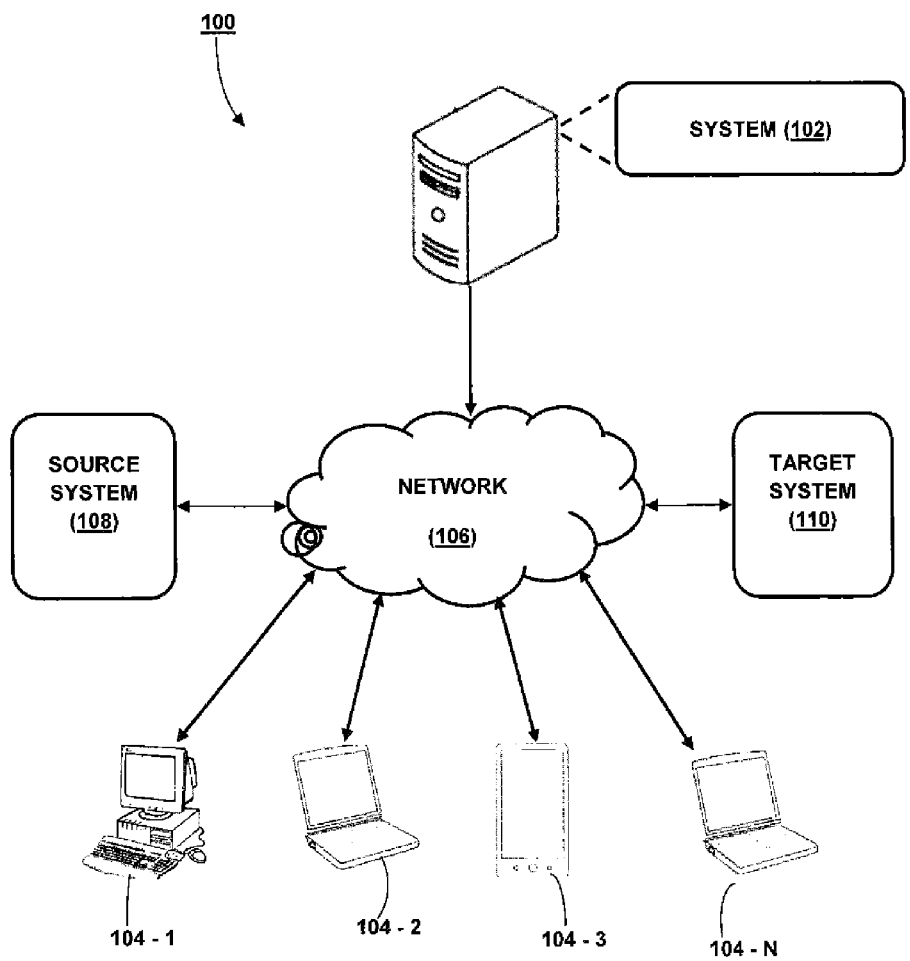
FIG. 1 illustrates a network implementation of a system for performance prediction of a software application that is to be implemented over a target system, in accordance with an embodiment of the present disclosure.

Referring now to FIG. 1, a network implementation 100 of the performance prediction system hereafter referred to as a system 102 for performance prediction of the software application over a target system 110 is illustrated, in accordance with an embodiment of the present disclosure. Although the present disclosure is explained by considering that the system 102 is implemented as a software program on a server, it may be understood that the system 102 may also be implemented in a variety of computing systems, such as a laptop computer, a desktop computer, a notebook, a workstation, a mainframe computer, a server, a network server, cloud, and the like. It will be understood that the system 102 may be accessed by multiple users through one or more user devices 104-1, 104-2, 104-3, . . . 104-N, collectively referred to as user devices 104 hereinafter, or applications residing on the user devices 104. Examples of the user devices 104 may include, but are not limited to, a portable computer, a personal digital assistant, a hand-held device, and a workstation. The user devices 104 are communicatively coupled to the system 102 through a network 106. Further the network 106 is also enabled to connect the system with a source system 108 and the target system 110.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
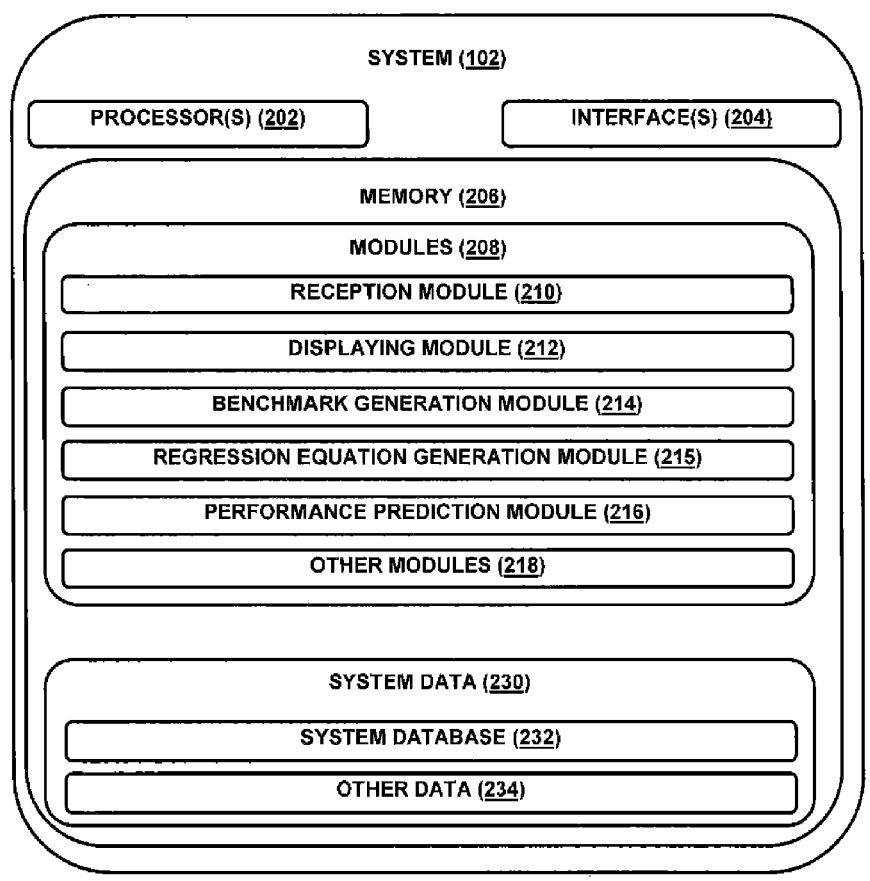
FIG. 2 illustrates the system for performance prediction of software application, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a reception module 210, a displaying module 212, a benchmark generation module 214, a regression equation generation module 215, a performance prediction module 216, and other modules 218. The other modules 218 may include programs or coded instructions that supplement applications and functions of the system 102.

The system data 230, amongst other things, serves as a repository for storing data processed, received, and generated by one or more of the modules 208. The system data 230 may also include a system database 232 and other data 234. The other data 234 may include data generated as a result of the execution of one or more modules in the other modules 218.

In one implementation, the multiple users may use the client devices 104 to access the system 102 via the I/O interface 204. In one embodiment, the system 102 may employ the reception module 210 to receive the software application from user devices 104. In one embodiment the user devices 104 may be a developer platform at which the software application is developed. Further, the system 102 is linked to a source system 108, wherein the source system 108 acts as a training environment for testing the software application. Further, the source system 108 is also enabled to maintain performance metrics of a set of standard software applications for different combination of workloads. The set of standard software applications with known performance metrics is hereafter referred to as a benchmark suite. In one embodiment the workload may be at least one of number of users accessing the application at the application layer, a number communication at the network layer, or an amount of data sent and retrieved at the database layer.

In one embodiment, the benchmark suite is prepared by workload mixing of HTTP scripts associated with the set of standard software applications in different proportions by the benchmark generation module 214. For all the benchmarks in the benchmark suite, the performance metrics such as CPU utilization (Application and database server), Network utilization, Disk utilization (Application and database server) and throughput are analysed for the set of standard software applications over the source system 108. Further, based on the analysis, performance metric data is generated for all tiers associated with the set of standard software applications. In one embodiment, the tiers may include an application layer, a database layer, and a server layer. The performance of the set of standard software applications at each tier is determined for a fixed concurrency and think-time and accordingly stored in the benchmark suite as performance metrics by the benchmark generation module 214. Once the benchmark suite is generated, a benchmark with performance characteristics similar to that of the software application is identified from the benchmark suit.

In the next step, the regression equation generation module 215 is enabled to generate a plurality of regression equations between the benchmark and the software application for each performance metrics. The regression equations are indicative of the correlation between the software application and the benchmark. In the next step, based on the benchmark and the regression equations generated at the source system 108, the process of predicting the performance of the software application is initiated by the performance prediction module 216. In one embodiment, the software application is a multi-tier software application, wherein the multi-tier may include an application layer, a database layer, and a server layer.

The performance prediction of the software application is classified into three major steps namely a) identifying a benchmark from the benchmark suite, having performance characteristics same as that to the software application, b) executing the set of standard software applications associated with the benchmark on the target system 110 with the combination of workload as specified by the benchmark, and c) predicting performance on target system 110 based on the performance of the set of standard software application over the target system 110. These three steps are explained in detail with respect to FIGS. 3 and 6.

Figure 3:
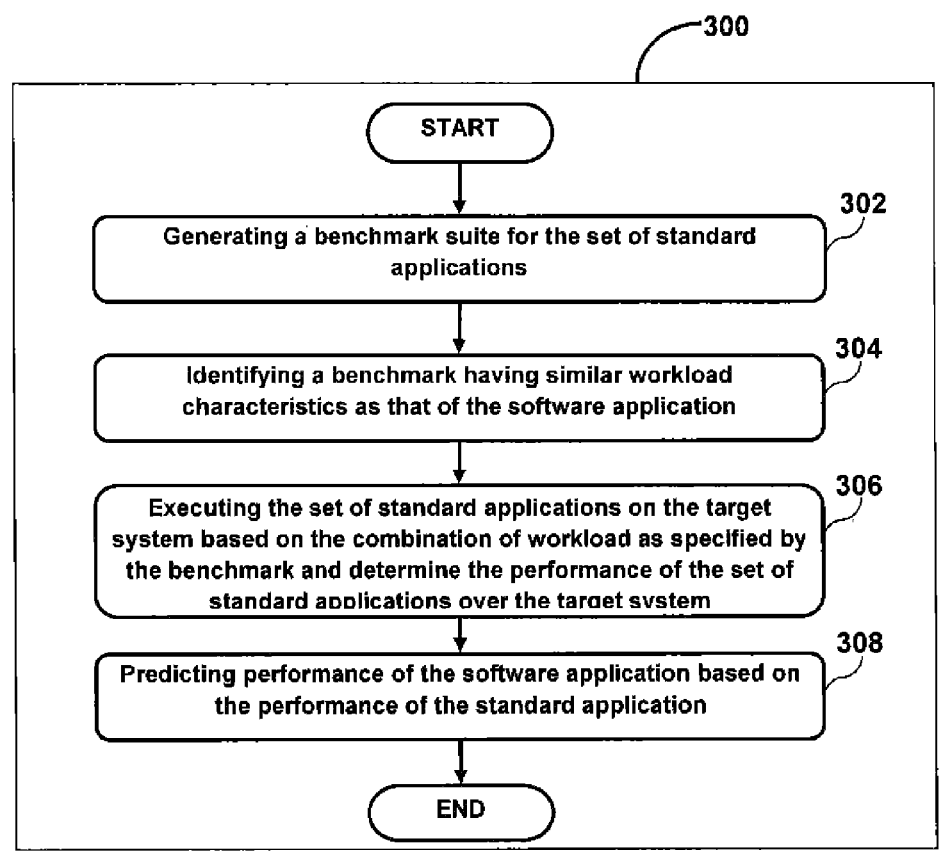
FIG. 3 illustrates a flowchart representing a method for determining the performance of the software application over the target system, in accordance with an embodiment of the present disclosure.

Referring now to FIG. 3, a flowchart for predicting the performance of the software application over the target system 110 is disclosed.

At block 302, the system 102 generates a benchmark suite by collecting information associated with the performance of the set of standard software applications over the source system 108, for different workload applied over a different set of standard software applications. In one embodiment, the benchmark suite is generated by the benchmark generation module 214. The process of generating the benchmark suite by the benchmark generation module 214 is further explained with respect to the flowchart of FIG. 4.

At block 304, the software application and the benchmark suite as analysed to identify a benchmark from the benchmark suite, wherein the identified benchmark may have performance characteristics the same as that of the software application. The process of identifying the benchmark from the benchmark suite is further explained with respect to the flowchart of FIG. 5.

At block 306, the set of standard software applications associated with the identified benchmark are executed on the target system 110 with the combination of workload as specified by the benchmark and accordingly a performance of the set of standard software applications on the target system 110 is captured. The process of executing the set of standard software applications over the target system 110 is further explained with respect to the flowchart of FIG. 6.

At block 308, based on the performance of the set of standard software applications on the target system 110 and the correlation between the software application and the set of standard software applications, the performance of the software application is predicted. In one embodiment the processing steps of block 304, 306 and 308 are performed by the performance prediction module 216.

Figure 4:
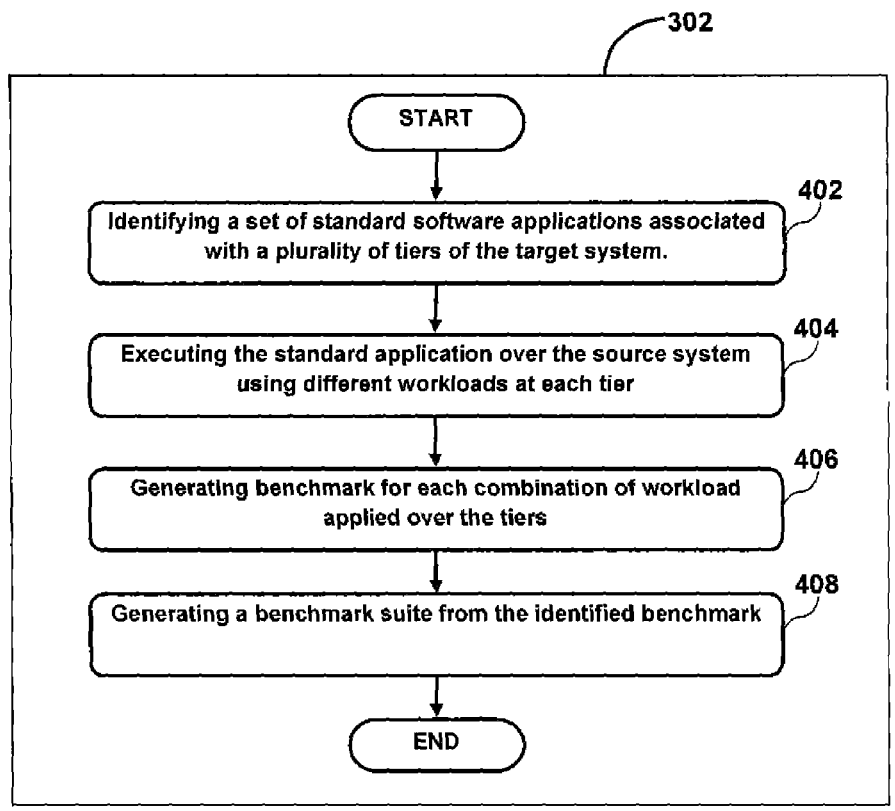
FIG. 4 illustrates a flowchart generating benchmark suite from a set of standard software application, in accordance with an embodiment of the present disclosure.

Referring now to FIG. 4, the detailed working of block 302 for generating a benchmark suite by collecting information associated with the performance of the set of standard software application over the source system 108 is disclosed.

At step 402, the set of standard software applications are categorized based on the tiers associated with each standard software application. The standard software application may be associated with tier such as an application layer, a database layer, or a server layer. In one embodiment, each standard software application may be associated with a single tier. In one embodiment, the standard software application has a known performance on the source system. The performance of the standard software applications is determined by executing standard software applications on the source system with a combination of workload specified by the benchmark.

At step 404, all the standard software applications from the set of standard software applications are executed over the source system 108 multiple times, by varying the combination of workload over the standard software applications in each execution.

At step 406, benchmarks are generated for each combination of workload applied over the set of standard software applications at each execution.

At step 408, a benchmark suit storing information of all the benchmarks is generated by the benchmark generation module 214. The benchmarks are configured to store performance metric associated with the standard software applications for a combination of workload applied over the set of standard software applications. In one embodiment, the benchmark in the benchmark suite stores performance metrics for CPU utilization, disk utilization, network utilization, and throughput associated with a database server and an application server for the set of standard software applications. In one embodiment, the performance metrics are generated for a fixed concurrency and think-time.

Figure 5:
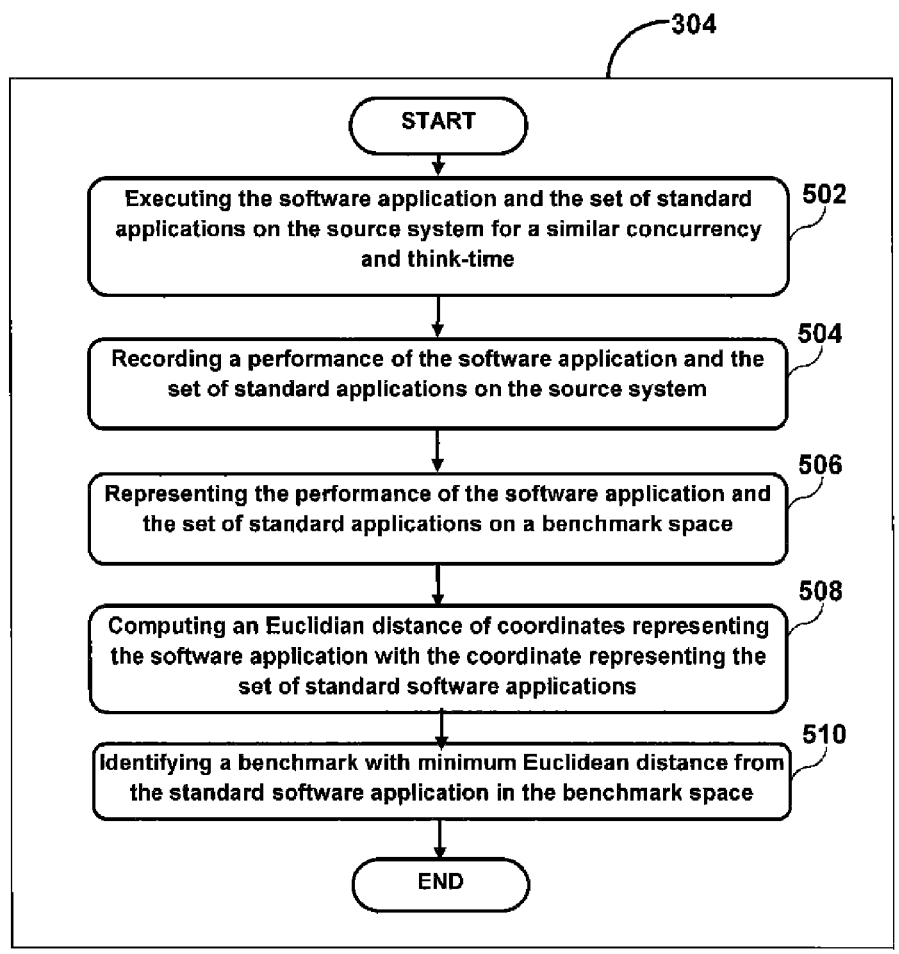
FIG. 5 illustrates a flowchart for identifying benchmark from the benchmark having performance characteristics same as that of the software application, in accordance with an embodiment of the present disclosure.

Referring now to FIG. 5, the process of analysing the software application and the benchmark suite to identify a benchmark of the benchmark suite, having performance characteristics same as that of the software application is disclosed.

At step 502, the software application and the set of standard software applications are executed on the source system 108 for a same set of concurrencies (e.g. 100, 200, 300 . . . ) and constant think-time. Alternately, the software application and the set of standard software applications are executed on the multiple source systems having different underlying hardware, for fixed concurrency and constant think-time.

At step 504, the performance of the set of standard software applications and the software application is captured on the source system 108 in the form of a performance matrix by the performance prediction module 216. The rows in the performance matrix represent benchmarks from the benchmark suite and columns represent performance corresponding to each performance metrics in the benchmark suite.

At step 506, Principal Component Analysis (PCA) is applied on the performance matrix associated with the set of standard software applications to generate a data transformation matrix. Once the data transformation matrix is generated, the data transformation matrix is applied on the performance matrix and a performance data of the software application to represent the software application and the set of standard software applications on a benchmark space. The benchmark space is a multidimensional space with more than two dimensions. These dimensions may include utilizations of CPU, disk, network and the like. Further, the dimension in the benchmark space may also include dimensions which are derived from the combination of CPU, disk, network utilization. The benchmark space is a graphical representation where the set of standard software applications and the software application are represented over a common platform.

At step 508, once the software application and the set of standard software applications are represented on the benchmark space, an Euclidean distance between each benchmark from the benchmark suite and the software application in the benchmark space is computed to identify the benchmark having the minimum Euclidean distance from the software application. For this purpose the Euclidean distance between the software application and benchmarks corresponding to standard software application are compared in the benchmark space.

At step 510, once the Euclidean distance between the software application and benchmarks corresponding to standard software application are compared, the benchmark having minimum Euclidean distance from the standard software application in the benchmark space is identified. In one embodiment, more than one benchmark may be identified, wherein the benchmarks are within the vicinity of the software application in the benchmark space. The benchmarks in the neighbourhood of software application are referred to as proxy applications. One the benchmark is identified, in the next step regression equations are generated between the benchmark and the software application. The process for generating the regression equations is further explained with respect to the working example given below. Further, the process of using the regression equations and the benchmark to identify the performance of the software application is disclosed in the flowchart of FIG. 6.

Figure 6:
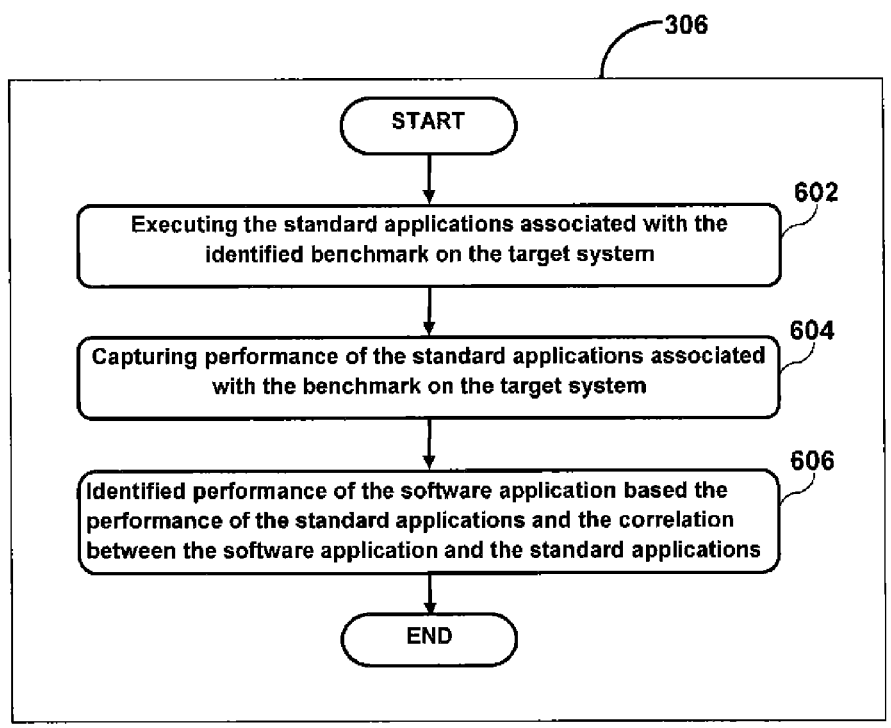
FIG. 6 illustrates a flowchart for predicting the performance of the software application based on the performance of the set of standard software applications on the target system, in accordance with an embodiment of the present disclosure.

Referring now to FIG. 6, a flowchart for predicting the performance of the software application based on the performance of the set of standard software applications on the target system 110 is disclosed.

At step 602, the set of standard software applications associated with the identified benchmark are executed on the target system 110 with the combination of workload specified by the benchmark.

At step 604, the performance of the set of standard software applications associated with the benchmark on the target system 110 is remotely analyzed.

At step 606, based on the correlation between the software application and the set of standard software applications and the performance of the set of standard software applications on the target system 110, the performance of the software application is predicted. In one embodiment, regression equations are generated by the regression equation generation module 215 at the source system 108 between the benchmark and software application for each performance metric. The regression equations are indicative of the correlation between the software application and the benchmark. In one embodiment, the regression equations may be generated using a) Regression using different concurrencies or b) Regression using metrics on different machines. These methods of generating regression equation are further explained with respect to the working example given below. In one embodiment, a performance metrics of software application on the target system 110 is generated using the regression equations generated on the source system 108 and performance of the standard software applications on the target system 110.

In one embodiment, based on the difference in workload that can be handled by the target system 110 and the source system 108, the generated performance of the software application is calibrated. Further, additional factors such as server categories and the number of cores of the source system 108 and the target system 110 are also considered by the performance prediction module 216 while predicting the performance of the software application on the target system 110.

Working Example

In an embodiment, the system and method are implemented to predict the performance of HTTP scripts of three different types of application in different proportions. Initially, the benchmark suite is prepared by applying different workloads for http scripts of three different types of standard software applications (SSA) in different proportions. The three standard software applications are EQUIZ™, NXGCEL™, and JPETSTORE™. The EQUIZ™ application provides a web-enabled technology platform to assess and verify technical skills of people throughout a large software company in an automated fashion. The EQUIZ™ application is implemented with java servlets, stores procedures, and incorporates an automatic code evaluation (ACE) framework. The NXGCEL™ application is a reporting application on mobile usage with a star-schema comprising of a fact table and six dimensions tables. The JPETSTORE™ application is an eCommerce J2EE application Benchmark. The basis of the JPETSTORE™ is an on-line application where users can browse and search for various types of pets in five top-level categories. The JPETSTORE™ application displays details including prices, inventory and images for all items within each category and with authenticated login it provides full shopping cart facility that includes credit card option for billing and shipping.

In one embodiment, more than thirty benchmarks are generated by applying different workload over the three standard software applications in different proportion. Appropriate mixing of standard software applications workload generates benchmarks with large range of performance metrics data. Further, the proposed strategy is tested with two different types of software applications namely Dell DVD™ and RUBIS™. The Dell DVD™ application is an open source simulation of an online ecommerce site, while the RUBIS™ application is an auction website prototype that is suitable for application servers performance scalability testing. The process of determining the performance of the Dell DVD™ and RUBIS™ applications is explained with respect to Tables I to Table VII. The following notations are used in Table I to Table VII:

N represents concurrency
Z represents thinktime
CPUa represents the average application server CPU utilization
CPUd represents the average database server CPU utilization
DISKa represents the average application server disk utilization.
DISKd represents the database server disk utilization
X represents throughput
NETr represents the network utilization for received transactions.
NETs represents the network utilization for sent transactions.

Initially, each of the standard software applications are tested on three ranges of servers as listed in the Table I. In the next step, a benchmark having performance characteristics same as that of the software application, i.e. the Dell DVD™ and RUBIS™ applications, are identified from the benchmark suite based on Euclidean distance in conjunction with Principle Component Analysis (PCA) algorithm. The set of standard software application configured as per the workload specified by the identified benchmark is hereafter referred to as a proxy application.

In one embodiment, the PCA Algorithm is used for dimensionality-reduction by using orthogonal transformation to convert correlated variables associated with the software application to a set of linearly uncorrelated variables called principal components. In the next step performance components are presented in the form of a performance matrix where rows represent the benchmarks and columns represent the performance metrics. Further, this matrix data is standardized by subtracting mean of the column from each data element and dividing by standard deviation of the column. In the next step PCA is performed on standardized data and a transformation matrix is generated. The PCA algorithm transforms n variables $X_1, X_2, X_3 \ldots X_n$ in to m principal components $Z_1, Z_2, Z_3 \ldots Z_m$ such that each $Z_i$ is a linear combination of original variables represented by equation (1)

$$Zi = \sum_{j=1}^{n} a_{ij} X_j \qquad (1)$$

with the following properties:

$$\text{var}[Z_1] \geq \text{var}[Z_2] \geq \ldots \text{var}[Z_m] \qquad (i)$$

$$\text{cov}[Z_i, Z_j] = 0, \forall i \neq j \qquad (ii)$$

The property (i) represents that most of the information is contained in the component $Z_1$ and least in $Z_m$ while property (ii) represents that two components are uncorrelated with no information overlap among them.

In one embodiment, once the proxy application is identified, one of the regression equation generation methods a) Regression using different concurrencies or b) Regression using metrics on different machines, is used by the regression equation generation module 215 to generate a linear regression equation between benchmark and software application on the source machine. Using these two regression equation generation methods, n performance metric data points {(xi,yi), i=1 ... n}, where xi represents the proxies data points and yi represents corresponding software application data points for the same metric. In the next step, regression equation (2) is generated for each metric. Where Y is a variable representing the software application metric defined in terms of corresponding proxy application metric X, slope a, intercept b of regression line.

$$Y = aX + b \qquad (2)$$

In the next step, the regression equation generation module 215 generates a regression equation between proxy application and the software applications for each metric, by varying concurrency (N) and keeping think-time (Z) constant as shown in the Table II and Table III. Using the regression equations generated by (a) Regression using different concurrencies, on source system, performance of software application is predicted on the target system. For the Dell DVD™ application, as represented in Table II, regression equation for metric CPUa generated using three concurrency data points N=100, 200, and 300 on source system is given by Y=0.285+0.871*X ... (3), where Y and X represent the software application and the proxy application variables respectively. Using the CPUa data on target system (X) i.e. 2.2 in the equation (3), CPUa metric (Y) is predicted as 2.01. Similarly, as represented in Table V, the performance metric for the RUBIS™ application is predicted on the target system.

TABLE I

Different layers (tiers) on which benchmarks and software application run

| Server Category | Features | OS/Architecture |
|---|---|---|
| High-Range Servers | 16 Core Xeon CPU @ 2.4 GHz, 12 MB L2 cache, 16 GB Memory | CentOS 6.1/x86_64 |
| | 8 Core Xeon CPU @ 2.6 GHz, 6 MB L2 cache, 8 GB Memory. | CentOS 6.5/x86_64 |
| Mid-Range Servers | 4 Core AMD Opteron @ 2.19 GHz, 1 MB L2 cache, 4 GB Memory | CentOS 5.4/x86_64 |
| | 8 Core Ultrasparc CPU @ 1.5 GHz, 32 MB L2 cache, 14 GB Memory | Solaris 10/SPARCV9 |
| | 8 Core Ultrasparc CPU @ 1.5 GHz, 32 MB L2 cache, 16 GB Memory | Solaris 10/SPARCV9 |
| Low-Range Servers | INTEL ® Core Duo CPU 2.33 GHz with 4 MB cache, 2 GB RAM | CentOS 6/x86_64 |
| | 2 Core Xeon CPU @ 3.2 GHz, 2 MB L2 cache, 2 GB Memory | CentOS 4/x86_64 |

TABLE II

Regression equation between the Dell DVD ™ application and proxy application

| Benchmark | N | Z (ms) | CPUa % | CPUd % | NETr % | X | DISKa % | DISKd % |
|---|---|---|---|---|---|---|---|---|
| Dell DVD ™ application | 500 | 2000 | 27.3 | 20.1 | 1 | 215 | 0.26 | 17.6 |
| | 300 | 2000 | 16.7 | 13.1 | 0.61 | 135.3 | 0.26 | 13.5 |
| | 100 | 2000 | 9 | 5.8 | 0.21 | 46.06 | 0.23 | 10.2 |
| Proxy application | 500 | 2000 | 29.8 | 11 | 12.9 | 236 | 0.24 | 30.7 |
| | 300 | 2000 | 21 | 7.1 | 8.2 | 153 | 0.24 | 20.3 |
| | 100 | 2000 | 9.1 | 3 | 2.7 | 52.91 | 0.23 | 8.7 |
| correlation coefficient | — | — | 0.98 | 1 | 0.993 | 1.0 | — | 0.995 |
| Regression equation (Y) | — | — | .285 + .871*X | .428 + 1.787*X | −0.007 + 0.077*X | −2.884 + 0.918*X | — | 7.093 + .335*X |

TABLE III

Regression equation between the RUBIS ™ application and proxy application

| Benchmark | N | Z (ms) | CPUa % | CPUd % | NETr % | X | DISKa % | DISKd % |
|---|---|---|---|---|---|---|---|---|
| RUBiS | 500 | 2000 | 15.1 | 16.8 | 1.1 | 304 | 0.31 | 11.1 |
| | 300 | 2000 | 10.8 | 10.3 | 0.69 | 182 | 0.33 | 10.3 |
| | 100 | 2000 | 3.8 | 3.6 | 0.23 | 60.53 | 0.3 | 4.7 |
| Proxy application | 500 | 2000 | 32.5 | 12.1 | 13.6 | 260 | 0.27 | 34.2 |
| | 300 | 2000 | 20 | 5.6 | 8.2 | 153 | 0.27 | 14.4 |
| | 100 | 2000 | 7.8 | 2.7 | 2.7 | 53 | 0.27 | 7.9 |
| Coefficient | — | — | 0.9896 | 0.9745 | 0.99 | 0.99 | NA | 0.769 |
| Regression equation (Y) | — | — | 0.714 + 0.457*X | 1.147 + 1.336*X | .021 + .08*X | −1.028 + 1.178*X | NA | 5.011 + .196*X |

In the next step, the proxy applications are run on target system for fixed concurrency and think-time. Using the regression equations generated on source system, performance of software application is predicted on target system as represented in Table IV and Table V for the Dell DVD™ application and the RUBIS™ application, respectively.

TABLE IV

Performance metric predictions for the Dell DVD ™ application on the target system

| Benchmark | N | Z (ms) | CPUa % | CPUd % | NETr % | X | DISKa % | DISKd % |
|---|---|---|---|---|---|---|---|---|
| Proxy application | 500 | 2000 | 2.2 | 12.3 | 13.6 | 241 | 0.2 | 35.9 |
| Dell DVD ™ application (predicted) | 500 | 2000 | 2.201 | 22.41 | 1.04 | 218.4 | — | 19.12 |

TABLE IV-continued

Performance metric predictions for the Dell DVD ™ application on the target system

| Benchmark | N | Z (ms) | CPUa % | CPUd % | NETr % | X | DISKa % | DISKd % |
|---|---|---|---|---|---|---|---|---|
| Dell DVD ™ application (Actual) | 500 | 2000 | 2.2 | 20.2 | 0.98 | 221 | 0.02 | 17.9 |
| % Error | — | — | .045 | 9.9 | 5.7 | 1.17 | — | 6.3 |

TABLE V

Performance metric prediction for the RUBIS ™ application on the target system

| Benchmark | N | Z (ms) | CPUa % | CPUd % | NETr % | X | DISKa % | DISKd % |
|---|---|---|---|---|---|---|---|---|
| Proxy application | 500 | 2000 | 2.5 | 11.9 | 12.3 | 256 | 0.2 | 35.4 |
| RUBIS ™ application (Actual) | 500 | 2000 | 1.7 | 43.8 | 1.2 | 308 | .01 | 5.5 |
| RUBIS ™ application (predicted) | 500 | 2000 | 1.54 | 42.55 | .96 | 305.7 | .01 | 5.18 |
| % Error | — | — | 8.93 | 2.83 | 19.6 | .73 | — | 5.74 |

In one embodiment, using the regression equation generation method (b) Regression using metrics on different machines, a regression equation for each metric is generated between the proxy application and software application by running the proxy application and software application on different architectures with a fixed concurrency and think-time as shown in table VI. The proxy application is run on target system for some fixed concurrency and think-time. Using the regression equations generated on source systems, performance of software application is predicted on target system. For the JPETSTORE™ application, as represented in Table VI, regression equation for metric CPUa generated using N=500 on three architectures i.e. low range, mid range and high range (Table I) is Y=1.1304*X+1.6299 . . . (4), where Y and X represent software application and the proxy application variables respectively. Using the proxy application CPUa data on target system (X) i.e. 16.76 in equation (4), CPUa metric (Y) is predicted as 20.55.

In one embodiment, performance for the JPETSTORE™ application on the target system using regression equation generated by using (b) Regression using metrics on different machines is predicted, as represented in Table VII. The CPU utilization on web server and the database server is predicted with 4.6% and less than 1% error respectively and through put is predicted with 6.33% error. The DISK utilization on the database server is predicted with 9.15% error. As represented in table VII, the maximum achievable throughput is 623 pages/sec for a maximum concurrency of 1300 as compared to actual throughput of 571 pages/sec for 1325 users on the target system. As represented from the tables IV and V, prediction error is less than 10% for both the test application across all the metrics.

TABLE VI

Regression equation between Dell DVD ™, RUBIS ™, JPETSTORE ™ and proxy applications

| Server | Application | CPUa % | DISKa % | X | CPUd % | DISKd % |
|---|---|---|---|---|---|---|
| Low range | Proxy application | 16.5 | 14.6 | 266 | 33.8 | 51.9 |
| | RUBIS ™ | 17.7 | 0.46 | 315 | 68.9 | 15.1 |
| | JPETSTORE ™ | 20.37 | 0.692 | 264.96 | 26.5 | 40.5 |
| Mid range | Proxy application | 17.02 | 13.2 | 266.85 | 12.5 | 35.7 |
| | RUBIS ™ | 17.72 | 0.9 | 298.5 | 43.1 | 7.3 |
| | JPETSTORE ™ | 20.81 | 0.269 | 270.94 | 9 | 24.6 |
| High range | Proxy application | 15.5 | 14.04 | 265 | 2 | 62.7 |
| | RUBIS ™ | 16.06 | 0.21 | 328 | 8 | 11.4 |
| | JPETSTORE ™ | 19.12 | 0.388 | 222.6 | 1.5 | 41.1 |
| Regression equation (Y) | JPETSTORE ™ and Proxy application | 1.1304*X + 1.6299 | 0.2895*X − 3.5875 | 26.414*X − 6772.8017 | 0.7913*X − 0.4072 | 0.6404*X + 3.3184 |
| | RUBIS ™ and Proxy application | 1.1655*X − 1.8851 | −0.3543*X + 5.465 | −16.25*X + 4635.25 | 1.823*X + 10.5156 | 0.1301*X + 4.2811 |

TABLE VII

Performance metric predictions for the JPETSTORE™ and RUBIS™ applications on the target system

| Application | CPUa % | DISKa % | X | CPUd % | DISKd % |
|---|---|---|---|---|---|
| Proxy application (X) | 16.76 | 14.70 | 267.23 | 5.93 | 51.61 |
| JPETSTORE™ Actual | 19.60 | 0.36 | 266.7 | 4.28 | 39.7 |
| JPETSTORE™ Predicted (Y) | 20.55 | 0.74 | 284.74 | 4.28 | 36.36 |
| % Error | 4.66 | — | 6.33 | 0.009 | -9.15 |
| RUBIS™ (Actual) | 17.52 | 0.54 | 322 | 29.68 | 9.40 |
| RUBIS™ Predicted (Y) | 17.64 | 0.25 | 292.76 | 21.30 | 10.99 |
| % Error | 0.72 | — | -9.98 | 28.22 | 14.51 |

Although implementations of system and method for predicting performance of a software application over a target system, it is to be understood that the appended claims are not necessarily limited to the specific features or methods described herein. However, the specific features and methods are disclosed as examples of implementations for displaying/presenting the data in multiple levels on the user interface.

We claim:

1. A method for predicting performance of a software application over a target system, the method comprising:
   generating, by a processor, a benchmark suite such that benchmark indicates a combination of workloads applied over a set of standard software applications running on a source system and performance characteristics, wherein the performance characteristics are derived based on the combination of workloads applied over the set of standard software applications running on a source system;
   identifying, by the processor, a benchmark of the benchmark suite, wherein the benchmark has performance characteristics same as that of the software application;
   remotely executing, by the processor, the set of standard software applications associated with the benchmark on the target system with a combination of workload as specified by the benchmark;
   recording, by the processor, performance of the set of standard software applications on the target system; and
   predicting, by the processor, performance of the software application based on the performance of the standard software applications on the target system, wherein predicting the performance of the software application on the target system includes:
      generating, at the source system, a plurality of regression equations between the benchmark and the software application for each performance metric, wherein the regression equations are indicative of the correlation between the software application and the benchmark;
      running the standard software applications with the combination of workload as specified by the benchmark on the target system with fixed concurrency to determine the performance of the standard software applications on the target system; and
      predicting performance metrics of the software application on the target system using the regression equations generated on the source system and performance of the standard software applications on the target system.

2. The method of claim 1, wherein the software application is a multi-tier software application comprising an application layer, a database layer, and a server layer.

3. The method of claim 2, wherein each of the standard software applications from the set of standard software applications is associated with at least one layer of the multi-tier application.

4. The method of claim 1, wherein a standard software application of the set of standard software applications has a known performance on the source system, wherein performance of the standard software applications is determined by executing standard software applications on the source system with a combination of workload specified by the benchmark.

5. The method of claim 1, wherein the benchmark in the benchmark suite stores performance metrics for CPU utilization, disk utilization, network utilization, and throughput associated with a database server and an application server for the set of standard software applications, wherein the performance metrics are generated for a fixed concurrency and think-time.

6. The method of claim 5, wherein identifying the benchmark comprises:
   a) executing the software application and the set of standard software applications on the source system for a same concurrency and constant think-time;
   b) recording a performance of the software application and the set of standard software applications on the source system in a performance matrix, wherein rows in the performance matrix represent benchmarks from the benchmark suite and columns represent performance corresponding to each performance metric;
   c) applying principle component analysis (PCA) on the performance matrix associated with the set of standard software applications to generate a data transformation matrix;
   d) applying the data transformation matrix on the performance matrix and a performance data of the software application to represent the software application and the set of standard software applications on a benchmark space; and
   e) computing an Euclidean distance between each benchmark from the benchmark suite and the software application in the benchmark space to identify the benchmark having the minimum Euclidean distance from the software application.

7. A system for predicting performance of a software application over a target system, the system comprising:
   a processor;
   a memory coupled to the processor, wherein the processor is configured for:
      generating a benchmark suite such that benchmark indicates a combination of workloads applied over a set of standard software applications running on a source system and performance characteristics, wherein the performance characteristics are derived based on the combination of workloads applied over the set of standard software applications running on a source system;
      identifying a benchmark of the benchmark suite, wherein the benchmark has performance characteristics same as that of the software application;

remotely executing the set of standard software applications associated with the benchmark on the target system with a combination of workload as specified by the benchmark;

recording performance of the set of standard software applications on the target system; and predicting performance of software application based on the performance of the standard software applications on the target system, wherein predicting the performance of the software application on the target system includes:

generating, at the source system, a plurality of regression equations between the benchmark and the software application for each performance metric, wherein the regression equations are indicative of the correlation between the software application and the benchmark;

running the standard software applications with the combination of workload as specified by the benchmark on the target system with fixed concurrency to determine the performance of the standard software applications on the target system; and predicting performance metrics of the software application on the target system using the regression equations generated on the source system and performance of the standard software applications on the target system.

8. The system of claim 7, wherein the software application is a multi-tier software application comprising an application layer, a database layer, and a server layer.

9. The system of claim 8, wherein each of the standard software applications from the set of standard software applications is associated with at least one layer of the multi-tier application.

10. The system of claim 7, wherein a standard software application of the set of standard software applications has a known performance on the source system, wherein performance of the standard software applications is determined by executing standard software applications on the source system with a combination of workload specified by the benchmark.

11. The system of claim 7, wherein the benchmark in the benchmark suite stores performance metrics for CPU utilization, disk utilization, network utilization, and throughput associated with a database server and an application server for the set of standard software applications, wherein the performance metrics are generated for a fixed concurrency and think-time.

12. The system of claim 11, wherein identifying the benchmark comprises:

a) executing the software application and the set of standard software applications on the source system for a same concurrency and constant think-time;

b) recording a performance of the software application and the set of standard software applications on the source system in a performance matrix, wherein rows in the performance matrix represent benchmarks from the benchmark suite and columns represent performance corresponding to each performance metric;

c) applying principle component analysis (PCA) on the performance matrix associated with the set of standard software applications to generate a data transformation matrix;

d) applying the data transformation matrix on the performance matrix and a performance data of the software application to represent the software application and the set of standard software applications on a benchmark space; and e) computing an Euclidean distance between each benchmark from the benchmark suite and the software application in the benchmark space to identify the benchmark having the minimum Euclidean distance from the software application.

13. A computer program product having embodied thereon a computer program for predicting performance of a software application over a target system, the computer program product comprising:

a program code for generating a benchmark suite such that benchmark indicates a combination of workloads applied over a set of standard software applications running on a source system and performance characteristics, wherein the performance characteristics are derived based on the combination of workloads applied over the set of standard software applications running on a source system;

a program code for identifying a benchmark of the benchmark suite, wherein the benchmark has performance characteristics same as that of the software application;

a program code for remotely executing the set of standard software applications associated with the benchmark on the target system with the combination of workload as specified by the benchmark;

a program code for recording a performance of the set of standard software applications on the target system; and a program code for predicting a performance of the software application based on the performance of the standard applications on the target system, wherein predicting the performance of the software application on the target system includes:

generating, at the source system, a plurality of regression equations between the benchmark and the software application for each performance metric, wherein the regression equations are indicative of the correlation between the software application and the benchmark;

running the standard software applications with the combination of workload as specified by the benchmark on the target system with fixed concurrency to determine the performance of the standard software applications on the target system; and predicting performance metrics of the software application on the target system using the regression equations generated on the source system and performance of the standard software applications on the target system.

* * * * *